(12) United States Patent
Nachenberg

(10) Patent No.: US 8,112,412 B1
(45) Date of Patent: Feb. 7, 2012

(54) AUTOMATIC SOFTWARE CATEGORIZATION AND RECOMMENDATIONS

(75) Inventor: Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 738 days.

(21) Appl. No.: 12/164,581

(22) Filed: Jun. 30, 2008

(51) Int. Cl.
*G06F 7/00* (2006.01)
(52) U.S. Cl. ........................... 707/710; 707/731
(58) Field of Classification Search .................. None
See application file for complete search history.

(56) References Cited

U.S. PATENT DOCUMENTS

| | | | | |
|---|---|---|---|---|
| 6,363,356 | B1* | 3/2002 | Horstmann | 705/26.7 |
| 7,054,900 | B1* | 5/2006 | Goldston | 709/203 |
| 2002/0055890 | A1* | 5/2002 | Foley | 705/27 |
| 2005/0210285 | A1* | 9/2005 | Williams | 713/201 |
| 2006/0195362 | A1* | 8/2006 | Jacobi et al. | 705/14 |
| 2006/0253584 | A1* | 11/2006 | Dixon et al. | 709/225 |
| 2006/0277118 | A1* | 12/2006 | Keohane et al. | 705/27 |
| 2008/0301666 | A1* | 12/2008 | Gordon et al. | 717/172 |
| 2009/0105987 | A1* | 4/2009 | Song et al. | 702/181 |

* cited by examiner

*Primary Examiner* — Vei-Chung Liang
(74) *Attorney, Agent, or Firm* — Brill Law Office; Jeffrey Brill

(57) ABSTRACT

Attempts by a user to download executable files with unacceptable reputations are detected, and recommendations for similar files with good reputations are made to the user. More specifically, a user's web browsing is tracked, and terms describing software applications are extracted from browsed pages. When a user attempts to download an executable file, a corresponding notification including recently extracted terms is transmitted to a categorization component, which receives such information from many users. The categorization component stores the received information in a database. This maintained database identifies files that are available for download, as well as corresponding extracted terms and reputational scores. If a user initiates a download of an executable file with an unacceptable score, the categorization component identifies executable files in the database with related extracted terms, but with acceptable reputations, to recommend to the user as alternatives.

20 Claims, 2 Drawing Sheets

AUTOMATIC SOFTWARE CATEGORIZATION AND RECOMMENDATIONS

TECHNICAL FIELD

This invention pertains generally to downloading software, and more specifically to automatically detecting attempts to download problematic software and generating recommendations of preferred alternatives.

BACKGROUND

Users often download software programs from the internet and other sources to run on their local computers. Downloading software allows users to quickly and conveniently access a wide variety of programs. Unfortunately, downloading programs from unknown or unverified sources can create various problems for users. Such problems range from the very serious, such as infection by computer viruses, spyware and other malicious code, to the less catastrophic but still significant, such as the downloading of unreliable, poorly performing or incompatible software.

Trusted parties can rate software programs, such that users can be provided with a relevant reputation score before downloading a file. Such reputation scores can rate software for likelihood of malicious code infection, as well as other issues such as performance and stability. Such a reputation scoring service can provide very useful information. For example, a user could be informed that the file s/he is about to download crashes on 30% of computers, or that the provider of the file is known for distributing programs infected with viruses. This type of information warns the user against downloading the file. However, the user is now stuck—s/he knows that the file should not be downloaded given its poor reputation, but does not know what a better alternative would be. It would be desirable to address this shortcoming.

SUMMARY

Attempts by a user to download executable files with unacceptable reputations are detected, and recommendations for similar files with good reputations are made to the user. More specifically, a user's web browsing is tracked, and terms describing software applications are extracted from browsed web pages. When a user attempts to download an executable file, a corresponding notification including recently extracted terms is transmitted to a categorization component, which receives such information from many users. The categorization component stores the received information in a database. This maintained database identifies executable files that are available for download, as well as extracted terms and reputational scores found in web pages associated with each application. If a user initiates a download of an executable file with an unacceptable score, the categorization component identifies executable files in the database with similar extracted terms (i.e., files that comprise similar software applications), but with acceptable reputations. The categorization component recommends these similar executable files with higher reputations to the user as alternatives.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
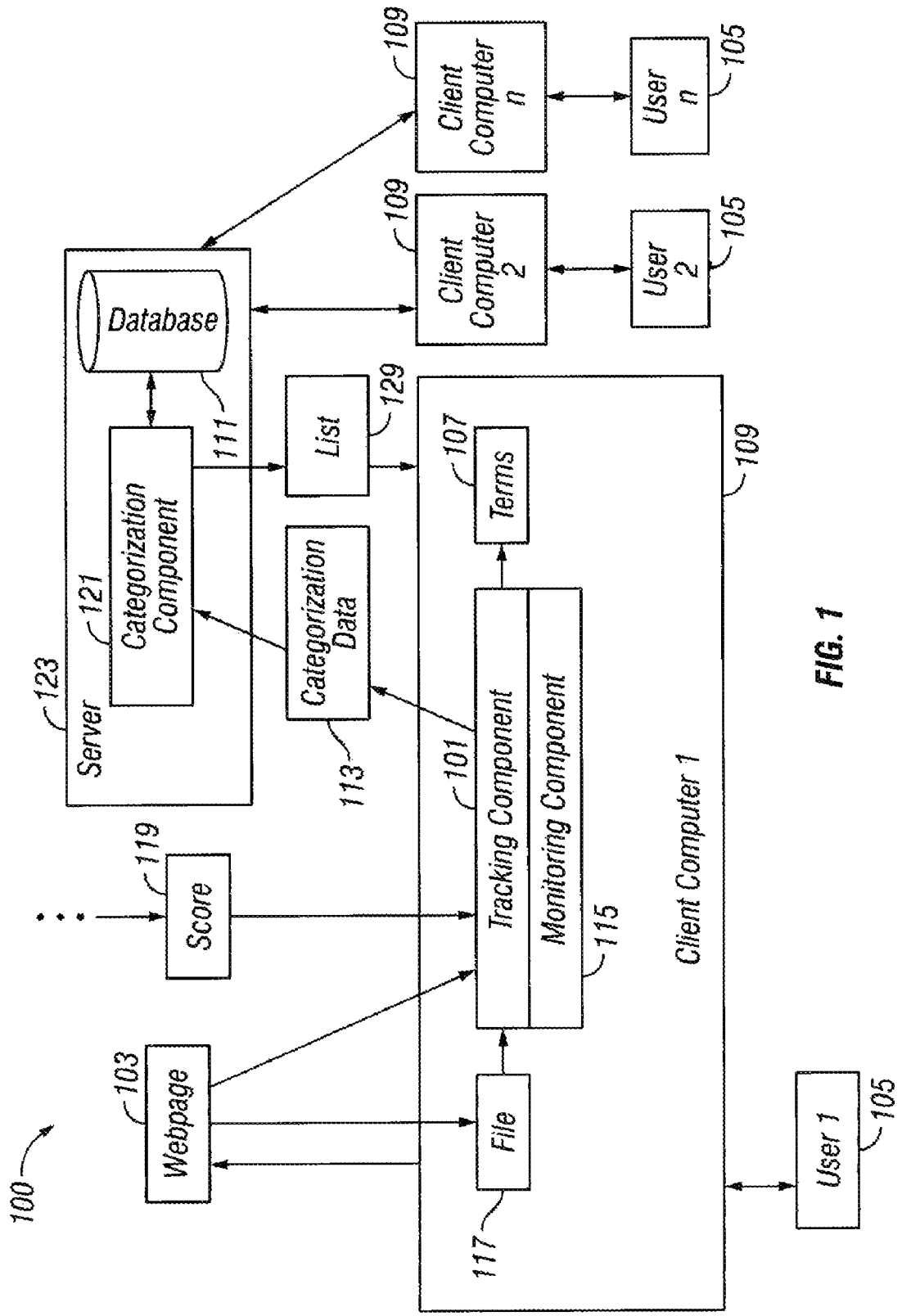
FIG. 1 is a block diagram illustrating a system for suggesting alternatives when a file to be downloaded has an unacceptable reputation, according to some embodiments of the present invention.

FIG. 1 illustrates a system 100 for suggesting alternatives when a file downloaded file 117 has an unacceptable reputation 119, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As explained in detail below, software applications (i.e., executable files 117) made available for download are automatically categorized (i.e., it can be automatically determined that foo.exe is a printer driver, bar.exe is a photo editor, etc.). The reputation 119 of an application 117 to be downloaded is gleaned, and if the application 117 has an unacceptable reputation 119, other applications 117 in the same category are suggested as alternatives.

As illustrated in FIG. 1, a tracking component 101 examines web pages 103 visited by a user 105. This component extracts all terms 107 from each visited page 103 that are used to describe software applications 117. These terms 107 are used in application categorization, as described in detail below. The specific terms 107 to extract are a variable design parameter, but the tracking component 101 can extract terms 107 such as, for example: driver, graphics, editor, photo, utility, music player, game, antivirus, archive, viewer, codec, windows, XP, vista, Linux, Mac, etc. The tracking component 101 stores extracted terms 107 (or a suitable data representation thereof), associating them with the web page 103 on which they appeared.

Individual tracking components 101 run on each of a plurality of user computers 109. FIG. 1 illustrates three user computers 109 as an example, but it is to be understood that typically the number would be much larger, so that a statistically robust database 111 of software categorization data 113 can be maintained, as described below. In one embodiment, the tracking component 101 is implemented as a web browser plug-in that is capable of examining web pages 103 visited by a user 105. In other embodiments, the tracking component 101 can be implemented in other ways, for example as an HTTP/HTTPS proxy (local or remote, configured or transparent). The implementation mechanics of examining web pages 103 browsed by users 105 and extracting specific terms 107 therefrom are within the skill set of those of ordinary skill in the relevant art, and the usage thereof within the context of the present invention will be readily apparent to one of such a skill level in light of this specification.

A download monitoring component 115 monitors attempts by the user 105 to download executable files 117. The implementation mechanics of identifying executable files 117 and monitoring network traffic for requests to download same are within the skill set of those of ordinary skill in the relevant art, and the usage thereof within the context of the present invention will be readily apparent to one of such a skill level in light of this specification. In one embodiment, the monitoring component 115 is implemented as a web browser plug-in, but it can also be implemented in other ways, such as a HTTP/HTTPS proxy (local or remote, configured or transparent) or a file-system driver.

When an attempt to download an executable file 117 is detected, the tracking component 101 obtains a reputational score 119 for that file 117. For purposes of the present invention, the reputational score 119 can be gleaned from any available source. For example, the tracking component 101 can transmit a request to a reputation server (not illustrated) for the reputational score 119. The tracking component 101 can identify the executable file 117 by including its hash in the request, or alternatively in other ways as desired. To obtain the hash of the executable file 117, in one embodiment the tracking component 101 permits the attempted download to execute, and then computes the hash (not illustrated) of the downloaded file 117 (alternatively the hash can be generated by reading the remote executable file 117 without downloading it, in instances in which it is read-accessible).

The tracking component 101 gathers all software-related terms 107 found on the preceding X web-pages 103, wherein X is a variable design parameter (e.g., X=1, X=2, X=3, etc.). The tracking component 101 submits these terms 107 (or a suitable data representation thereof), an identifier of the executable file 117 (e.g., its hash) and optionally the file's reputational score 119 (collectively referred to as the "categorization data" 113) to a categorization component 121, which typically runs at a centrally accessible location such as a server 123 as illustrated. In one embodiment, the tracking component 101 sends the categorization data 113 to the categorization component 121 only if the file 117 in question is found to have a reputation score below a certain threshold. In another embodiment, the tracking component 121 sends categorization data 113 for every file 117 downloaded, regardless of its reputation.

Each time a tracking component 101 provides categorization data 113 for a file 117, the categorization component 121 adds this information 113 to a database 111 (or other suitable storage mechanism). It is to be understood that the server 123 on which the categorization component 121 runs can also host the functionality that provides reputational scores 119, but this need not be the case. These two functionalities can be integrated or separated to any degree as desired. In some embodiments in which the functionalities are integrated, the tracking component 101 does not obtain the file's reputational score 119, as this information is available to the categorization component 121 directly. In such embodiments, the tracking component 101 simply submits the file identifier and the extracted terms 107 to the categorization component 121. In embodiments in which these functions are not integrated, the categorization component 121 can but need not provide categorization data 113 to the reputation service. It is to be understood that when describing embodiments in which these functions are not integrated, the term "categorization data" can but need not refer to just an identifier of an executable file 117 (e.g., its hash) and a set of corresponding extracted terms, but not the file's reputational score 119.

In any case, if the reputation 119 of the executable file 117 is acceptable, the file 117 can be run on the client computer 109. In some embodiments, the file 117 has already been downloaded onto the user's computer 109, so that its hash could be computed. In other embodiments, the hash was computed without downloading the file 117, in which case the file 117 is downloaded at this point.

If the file 117 has a negative reputation 119, then further processing is executed to provide alternative recommendations, as described below. It is to be understood that what specifically comprises acceptable and unacceptable reputational scores 119 are design parameters, which can but need not vary for different users 105 and different applications or application types.

Where the reputation 119 of the file is not acceptable, the categorization component 121 can categorize the file 117 and provide appropriate recommendations by employing any of a number of machine learning techniques, such as Support Vector Machines, self organizing maps, neural networks or Latent Semantic Indexing. More specifically, the categorization component can apply these techniques to the categorization data 113 corresponding to the various files 117 in the database 111 to identify contextually similar groups of terms 107 pertaining to other files 117 with acceptable reputations 119. The identified files 117 are added to a list 129 of recommendations of alternate applications, which is presented to the user 105 as described below. In embodiments in which the categorization and reputation functionality are not tightly integrated, the categorization component 121 can request recommendations from the reputation service.

As illustrated, the categorization component 121 provides the list 129 of recommended alternative executable files 117 to the user 105. The list 129 can include the URLs at which these files 117 are available for download, the reputational scores 119 of these files 117, and any additional information as desired. The user 105 can click on one of the URLs or otherwise select one of the recommended alternatives to download. In addition, the provider can potentially charge a fee to either the consumer or the alternate software publisher for the referral. Additionally, in some embodiments, interested parties can pay the provider to recommend specific reliable executable files 117 when a user 105 initiates a download of an unreliable (or alternatively even a reliable) application 117 of a similar category.

Figure 2:
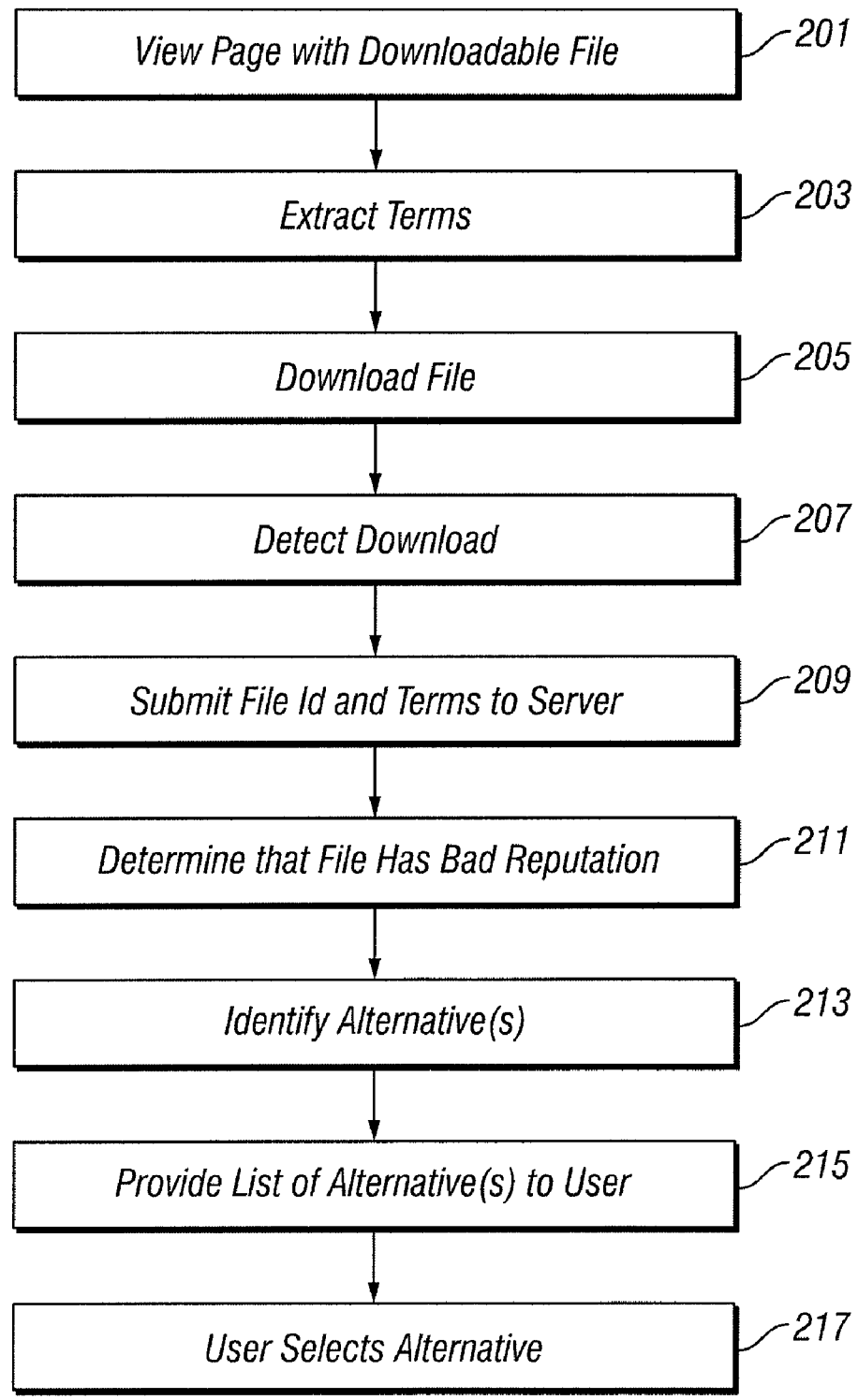
FIG. 2 is a flowchart illustrating steps for suggesting alternatives when a file to be downloaded has an unacceptable reputation, according to one embodiment of the present invention.

FIG. 2 illustrates steps for using this functionality, according to an example application of one embodiment of the present invention. Suppose a user 105 surfs the web and views 201 a specific page 103 describing an exciting new multiplayer, shoot-em-up arcade game for Windows. As it happens, the executable file 117 made available by the web page 103 is actually a Trojan horse, but it is being advertised as a game. The tracking component 101 extracts 203 terms 107 like "multiplayer," "shoot," "game" and "windows XP" from the webpage 103. The user 105 downloads 205 the (malicious) file 117 to his computer 109. This download is detected 207 by the monitoring component 115, and the tracking component transmits 209 the extracted terms 107 and the file's hash to the categorization component 121. The categorization component 121 determines 211 that the file 117 has a poor reputation 119, and identifies 213 several reliable alternatives in the database 111. The categorization component 121 provides 215 a list 129 of the alternatives to the user 105. These alternatives are all high-reputation executable files 117 associated with the same types of terms 107, found prior to the download. The user 105 then selects 217 one of these alternatives for download and use.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for suggesting reputable executable files for users to download, the method comprising the steps of:
    maintaining, by a computer, a database of categorization data concerning each of a plurality of executable files, wherein the executable files are available to users for download;
    wherein categorization data concerning each specific executable file comprises at least a plurality terms extracted from websites accessed by users prior to attempting to download the specific executable file, such that the terms indicate a category of executable file type for the specific executable file;
    receiving, by a computer, notifications from a plurality of users, each of the notifications comprising at least an identifier of an executable file, downloading of which has been initiated by a user, and indications of terms describing the executable file extracted from at least one web page accessed by that user prior to initiating the downloading;
    gleaning, by a computer, reputational scores of executable files identified in the received notifications;
    adding, by a computer, categorization data concerning the identified executable files to the database;
    responsive to determining that a reputational score for a specific, identified executable file of a specific category is not acceptable, identifying, by a computer, at least one executable file of the same specific category with an acceptable reputational score; and
    recommending, by a computer, the at least one executable file of the same specific category to a corresponding user.

2. The method of claim 1 wherein gleaning reputational scores of identified executable files further comprises:
    reading reputational scores from notifications received from users, in which the reputational scores are embedded.

3. The method of claim 1 wherein gleaning reputational scores of identified executable files further comprises:
    receiving reputational scores from a reputation service.

4. The method of claim 1 wherein identifying at least one executable file of the same specific category with an acceptable reputational score further comprises:
    examining categorization data pertaining to executable files in the database; and
    identifying categorization data in the database concerning at least one executable file with an acceptable reputational score, the identified categorization data comprising indications of extracted terms related to those of the executable file with the unacceptable reputational score.

5. The method of claim 4 wherein identifying at least one executable file of the same specific category with an acceptable reputational score, the identified categorization data comprising indications of extracted terms related to those of the executable file with the unacceptable reputational score, further comprises:
    applying at least one machine learning technique to categorization data corresponding to executable files in the database, to identify contextually related groups of terms pertaining to executable files with acceptable reputations.

6. The method of claim 5 wherein the at least one machine learning technique is at least one technique from a group consisting of:
    Vector Machines;
    self organizing maps;
    Neural Networks; and
    Latent Semantic Indexing.

7. The method of claim 1 wherein identifying at least one executable file of the same specific category with an acceptable reputational score further comprises:
    identifying at least one executable file with an acceptable reputational score for which a third party has sponsored recommendation as an executable file of the same specific category as executable files with categorization data related to that of the executable file with the unacceptable reputational score.

8. A computer implemented method for receiving and processing suggestions concerning reputable executable files to download, the method comprising the steps of:
    examining, by a computer, web pages browsed by a user;
    extracting, by a computer, terms describing downloadable executable files from visited web pages, such that the terms indicate categories of executable file types for specific executable files;
    detecting, by a computer, attempts by the user to download executable files;
    responsive to each detected attempt, transmitting, by a computer, at least an identifier of the corresponding executable file and indications of recently extracted terms to a categorization component; and responsive to at least one transmission to the categorization component, receiving, by a computer, a recommendation of at least one alternative executable file with an acceptable reputation to download.

9. The method of claim 8 wherein transmitting at least an identifier of the corresponding executable file and indications of recently extracted terms to a categorization component further comprises:
   obtaining a reputational score of the executable file; and
   transmitting the identifier of the executable file, the reputational score of the executable file and the recently extracted terms to the categorization component.

10. The method of claim 8 further comprising:
   selecting and downloading a recommended alternative executable file with an acceptable reputational score.

11. At least one non-transitory computer readable medium containing a computer program product for suggesting reputable executable files for users to download, the computer program product comprising:
   program code for maintaining, by a computer, a database of categorization data concerning each of a plurality of executable files, wherein the executable files are available to users for download;
   wherein categorization data concerning each specific executable file comprises at least a plurality terms extracted from websites accessed by users prior to attempting to download the specific executable file, such that the terms indicate a category of executable file type for the specific executable file;
   program code for receiving, by a computer, notifications from a plurality of users, each of the notifications comprising at least an identifier of an executable file, downloading of which has been initiated by a user, and indications of terms describing the executable file extracted from at least one web page accessed by that user prior to initiating the downloading;
   program code for gleaning, by a computer, reputational scores of executable files identified in the received notifications;
   program code for adding, by a computer, categorization data concerning the identified executable files to the database;
   program code for, responsive to determining that a reputational score for a specific, identified executable file of a specific category is not acceptable, identifying, by a computer, at least one executable file of the same specific category with an acceptable reputational score; and
   program code for recommending, by a computer, the at least one executable file of the same specific category to a corresponding user.

12. The at least one non-transitory computer readable medium of claim 11 wherein the program code for gleaning reputational scores of identified executable files further comprises:
   program code for reading reputational scores from notifications received from users, in which the reputational scores are embedded.

13. The at least one non-transitory computer readable medium of claim 11 wherein the program code for gleaning reputational scores of identified executable files further comprises:
   program code for receiving reputational scores from a reputation service.

14. The at least one non-transitory computer readable medium of claim 11 wherein the program code for identifying at least one executable file of the same specific category with an acceptable reputational score further comprises:
   program code for examining categorization data pertaining to executable files in the database; and
   program code for identifying categorization data in the database concerning at least one executable file with an acceptable reputational score, the identified categorization data comprising indications of extracted terms related to those of the executable file with the unacceptable reputational score.

15. The at least one non-transitory computer readable medium of claim 14 wherein the program code for identifying at least one executable file of the same specific category with an acceptable reputational score, the identified categorization data comprising indications of extracted terms related to those of the executable file with the unacceptable reputational score, further comprises:
   program code for applying at least one machine learning technique to categorization data corresponding to executable files in the database, to identify contextually related groups of terms pertaining to executable files with acceptable reputations.

16. The at least one non-transitory computer readable medium of claim 15 wherein the at least one machine learning technique is at least one technique from a group consisting of:
   Vector Machines;
   self organizing maps;
   Neural Networks; and
   Latent Semantic Indexing.

17. The at least one non-transitory computer readable medium of claim 11 wherein the program code for identifying at least one executable file of the same specific category with an acceptable reputational score further comprises:
   program code for identifying at least one executable file with an acceptable reputational score for which a third party has sponsored recommendation as an executable file of the same specific category as executable files with categorization data related to that of the executable file with the unacceptable reputational score.

18. At least one non-transitory computer readable medium containing a computer program product for receiving and processing suggestions concerning reputable executable files to download, the computer program product comprising:
   program code for examining, by a computer, web pages browsed by a user;
   program code for extracting, by a computer, terms describing downloadable executable files from visited web pages, such that the terms indicate categories of executable file types for specific executable files;
   program code for detecting, by a computer, attempts by the user to download executable files;
   program code for, responsive to each detected attempt, transmitting, by a computer, at least an identifier of the corresponding executable file and indications of recently extracted terms to a categorization component; and
   program code for, responsive to at least one transmission to the categorization component, receiving, by a computer, a recommendation of at least one alternative executable file with an acceptable reputation to download.

19. The at least one non-transitory computer readable medium of claim 18 wherein the program code for transmitting at least an identifier of the corresponding executable file and indications of recently extracted terms to a categorization component further comprises:
   program code for obtaining a reputational score of the executable file; and program code for transmitting the identifier of the executable file, the reputational score of the executable file and the recently extracted terms to the categorization component.

20. The at least one non-transitory computer readable medium of claim 18 further comprising:

program code for selecting and downloading a recommended alternative executable file with an acceptable reputational score.

* * * * *

UNITED STATES PATENT AND TRADEMARK OFFICE
CERTIFICATE OF CORRECTION

| | | |
|---|---|---|
| PATENT NO. | : 8,112,412 B1 | |
| APPLICATION NO. | : 12/164581 | |
| DATED | : February 7, 2012 | |
| INVENTOR(S) | : Carey Nachenberg | |

It is certified that error appears in the above-identified patent and that said Letters Patent is hereby corrected as shown below:

In the Claims:

Col. 7, claim 11, line 25, replace "plurality terms" with "plurality of terms"

Signed and Sealed this
Seventeenth Day of April, 2012

David J. Kappos
*Director of the United States Patent and Trademark Office*